(12) United States Patent
Bhat (10) Patent No.: US 10,325,148 B2
(45) Date of Patent: Jun. 18, 2019

(54) METHOD AND A SYSTEM FOR OPTICAL CHARACTER RECOGNITION

(71) Applicant: Wipro Limited, Bangalore (IN)

(72) Inventor: Hemachandra Bhat, Bangalore (IN)

(73) Assignee: Wipro Limited, Bangalore (IN)

( * ) Notice: Subject to any disclaimer, the term of this patent is extended or adjusted under 35 U.S.C. 154(b) by 156 days.

(21) Appl. No.: 15/359,533

(22) Filed: Nov. 22, 2016

(65) Prior Publication Data

US 2018/0096231 A1    Apr. 5, 2018

(30) Foreign Application Priority Data

Sep. 30, 2016   (IN) .............................. 201641033589

(51) Int. Cl.
  *G06K 9/00*   (2006.01)
  *G06K 9/62*   (2006.01)
  *G06K 9/68*   (2006.01)

(52) U.S. Cl.
  CPC ....... *G06K 9/00463* (2013.01); *G06K 9/6282* (2013.01); *G06K 9/6821* (2013.01); *G06K 9/6814* (2013.01); *G06K 2209/01* (2013.01)

(58) Field of Classification Search
  CPC . G06K 9/6282; G06K 9/00463; G06K 9/6821
  USPC ...................................................... 382/200
  See application file for complete search history.

(56) References Cited

U.S. PATENT DOCUMENTS

| | | | |
|---|---|---|---|
| 3,142,818 A | 7/1964 | Holt | |
| 4,326,190 A | 4/1982 | Borland et al. | |
| 6,122,275 A | 9/2000 | Karol et al. | |
| 6,587,583 B1 * | 7/2003 | Kurzweil | G06T 9/00 358/462 |
| 7,664,728 B2 | 2/2010 | Wortendyke et al. | |
| 2005/0259866 A1 * | 11/2005 | Jacobs | G06K 9/00463 382/157 |

(Continued)

FOREIGN PATENT DOCUMENTS

CA    2628704 A1    4/2008

OTHER PUBLICATIONS

Yoghoubi, et al., "Handwritten Recognition Using Slope and Curvature Functions", Journal, Dec. 8, 2012, pp. 17-20, vol. 4.

(Continued)

*Primary Examiner* — Justin P. Misleh
(74) *Attorney, Agent, or Firm* — Pepper Hamilton LLP (57) ABSTRACT

A method and a system are described for performing optical character recognition on an image including a plurality of printed characters. The method includes defining one or more opcodes and direction pointers associated with the plurality of printed characters of a language and a font type, wherein each of the one or more opcodes has an associated unique opcode characterization value. The method includes creating a binary tree comprising a plurality of nodes, wherein each node of the plurality of nodes is assigned the unique opcode characterization value. The method includes retrieving a set of operations associated with the unique opcode characterization value assigned to each of the plurality of nodes. The method includes navigating the binary tree from a root node to a leaf node based on the set of operations, the first pointer value, and the second pointer value until the leaf node is reached.

12 Claims, 5 Drawing Sheets

(56) References Cited

U.S. PATENT DOCUMENTS

2008/0127125 A1* 5/2008 Anckaert ............... G06F 21/53
  717/136
2015/0131912 A1   4/2015 Kasthuri
2015/0379428 A1* 12/2015 Dirac ................... G06N 99/005
  706/12

OTHER PUBLICATIONS

Hafiz, et al., "Handwritten Digit Recognition Using Slope Detail Features", Journal, May 5, 2014, pp. 14-19, vol. 93.
Fujisawa, et al., "Handwritten Numeral Recognition Using Gradient and Curvature of Gray Scale Image", Sep. 22, 1999, 6 pages, IEEE.

* cited by examiner

FIG. 5 Example Computer System

METHOD AND A SYSTEM FOR OPTICAL CHARACTER RECOGNITION

This application claims the benefit of Indian Patent Application Serial No. 201641033589 filed Sep. 30, 2016 which is hereby incorporated by reference in its entirety.

FIELD

The present subject matter is related, in general to character recognition systems, and more particularly, but not exclusively to a method and a system for optical character recognition of a plurality of printed characters.

BACKGROUND

With the advent of technology, digitization of documents may be required in all administrative offices. After digitization of such documents, verification of data that is printed on the documents needs to be done. For example, verification of documents submitted as proofs to institutions like insurance and banking needs to be performed. Thus, character recognition systems have been used to identify the characters (printed text) in the digitized documents. In an embodiment, the digitized documents contain printed characters with different languages and different font types.

Character recognition systems traditionally may utilize feature analysis on a printed character to be recognized by tracing the boundary of the printed character to locate stops or inflection points on the printed character. The printed character features may be detected from sequence of boundary slope, vector slope and vector curve calculations to form a feature set. The set of features may be then analyzed in a sequential logic decision tree (e.g. Binary tree) to identify/recognize the printed character. The disadvantage of the traditional character recognition systems may be that the system has to identify boundary stops or inflection points on each printed character and then analyze sequence of features such as, boundary and slopes through sequential logic decision tree with node/branches at every boundary stops or inflection points. This results in more nodes or tree depth (i.e. decision iteration) and processing time. Additionally, traditional character recognition systems and methods may not be easily adaptable for multiple language characters and font types.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method for performing optical character recognition on an image including a plurality of printed characters. The method may include defining, by an optical character recognition unit, one or more opcodes and direction pointers associated with the plurality of printed characters of a language and a font type, wherein each of the one or more opcodes has an associated unique opcode characterization value. The method may further include creating, by the optical character recognition unit, a binary tree comprising a plurality of nodes, wherein each node of the plurality of nodes may be assigned the unique opcode characterization value, associated with each of the one or more opcodes, and the direction pointers comprising a first pointer value and a second pointer value. The method may further include retrieving, by the optical character recognition unit, a set of operations associated with the unique opcode characterization value assigned to each of the plurality of nodes. The method may further include navigating, by the optical character recognition unit, the binary tree from a root node to a leaf node based on the set of operations, the first pointer value, and the second pointer value until the leaf node from the plurality of nodes may be reached, wherein each of the leaf nodes represent one or more unique pre-defined features associated with a unique printed character from the plurality of printed characters.

According to embodiments illustrated herein, there may be provided an application server to perform optical character recognition on an image including a plurality of printed characters. The application server may comprise a processor and a memory communicatively coupled to the processor. The memory stores processor instructions, which, on execution, causes the processor to define one or more opcodes and direction pointers associated with the plurality of printed characters of a language and a font type, wherein each of the one or more opcodes has an associated unique opcode characterization value. The processor may be further configured to create a binary tree comprising a plurality of nodes, wherein each node of the plurality of nodes may be assigned the unique opcode characterization value, associated with each of the one or more opcodes, and the direction pointers comprising a first pointer value and a second pointer value. The processor may be further configured to retrieve a set of operations associated with the unique opcode characterization value assigned to each of the plurality of nodes. The processor may be further configured to navigate the binary tree from a root node to a leaf node based on the set of operations, the first pointer value, and the second pointer value until the leaf node from the plurality of nodes may be reached, wherein each of the leaf nodes represent one or more unique pre-defined features associated with a unique printed character from the plurality of printed characters.

According to embodiments illustrated herein, a non-transitory computer-readable storage medium having stored thereon, a set of computer-executable instructions for causing a computer comprising one or more processors to perform steps of defining one or more opcodes and direction pointers associated with the plurality of printed characters of a language and a font type, wherein each of the one or more opcodes has an associated unique opcode characterization value. The one or more processors may be configured to create a binary tree comprising a plurality of nodes, wherein each node of the plurality of nodes may be assigned the unique opcode characterization value, associated with each of the one or more opcodes, and the direction pointers comprising a first pointer value and a second pointer value. The one or more processors may be configured to retrieve a set of operations associated with the unique opcode characterization value assigned to each of the plurality of nodes. The one or more processors may be configured to navigate the binary tree from a root node to a leaf node based on the set of operations, the first pointer value, and the second pointer value until the leaf node from the plurality of nodes may be reached, wherein each of the leaf nodes represent one or more unique pre-defined features associated with a unique printed character from the plurality of printed characters.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions

One or more opcodes may be referred to as numbers that start from "0" onwards and maximum of "255", in an embodiment. In an embodiment, the numbers encompassed by the one or more opcodes may be expanded based on the number of printed characters available in each language. In an embodiment, the opcode associated with 0 is a reserved opcode. In an embodiment, the one or more opcodes may be utilized to identify one or more common features or one or more unique features that the printed character satisfies. For example, the opcode 1 may be utilized to detect if the printed character has a left vertical line. Similarly, opcode 2 may be utilized to detect if the printed character has a top horizontal line.

Printed characters may be referred to as characters that may be obtained on a document as a result of printing process implemented by a printer device. In an embodiment, printed characters may not include handwritten characters. In an embodiment, the printed characters comprise the alphabets associated with a particular language and a particular font type. In an embodiment, the printed characters may also comprise special characters. Examples of the printed characters for the English language and font type Times new roman may comprise the 26 alphabets of the English language.

One or more pre-defined features refer to one or more characteristics associated with the plurality of printed characters. The one or more pre-defined features may comprise a vertical line on left side of printed character i.e. slope is infinity, non-vertical line on left side printed character, vertical line on right side of printed character, horizontal lines on characters, top horizontal line slope is zero, horizontal line at center, right vertical line, left slope decrease, and left slope increase.

In an embodiment, the one or more pre-defined features may comprise one or more common pre-defined features and one or more unique pre-defined features. In an embodiment, one or more printed characters may have more than one pre-defined features that may be common. Such features are referred to as one or more common pre-defined features. For example, for the printed characters B, D, E, F, H, I, K, L, M, N, P, R, U the one or more common features may comprise a vertical line on left side of printed character i.e. slope is infinity, a horizontal line on characters. In an embodiment, one or more printed characters may have more than one pre-defined features that may be unique. For example, the one or more unique features for printed character H may comprise a vertical line on left side of printed character i.e. slope is infinity, a vertical line on right side of printed character i.e. slope is infinity, and a horizontal line at center.

Figure 1:
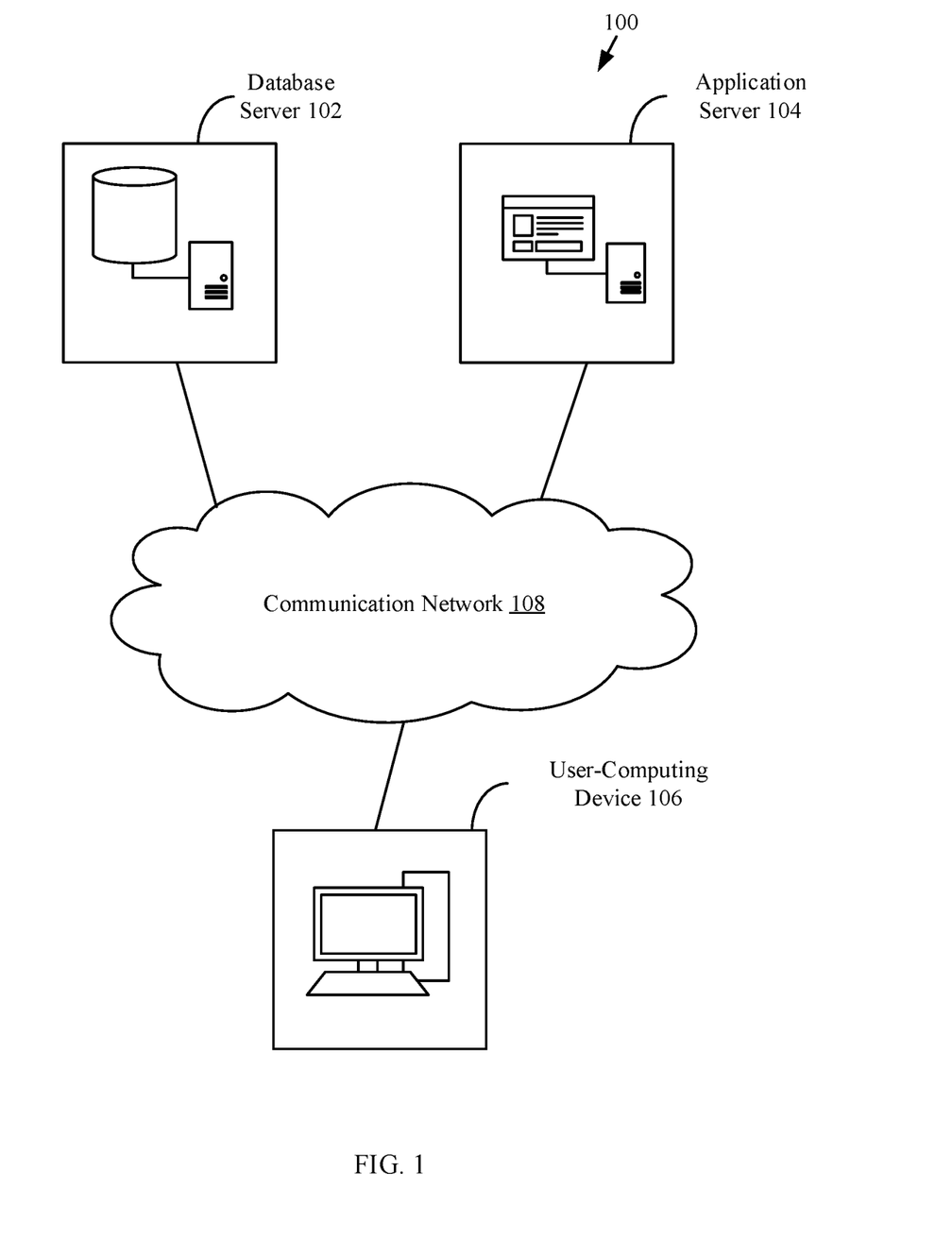
FIG. 1 is a block diagram that illustrates a system environment in which various embodiments of the method and the system may be implemented.

FIG. 1 is a block diagram that illustrates a system environment 100 in which various embodiments of the method and the system may be implemented. The system environment 100 may include a database server 102, an application server 104, a user-computing device 106, and a communication network 108. The application server 104 may be communicatively coupled to the database server 102 and the user-computing device 106 via the communication network 108. In an embodiment, the application server 104 may communicate with the database server 102 using one or more protocols such as, but not limited to, Open Database Connectivity (ODBC) protocol and Java Database Connectivity (JDBC) protocol. In an embodiment, the user-computing device 106 may communicate with the application server 104, via the communication network 106.

In an embodiment, the database server 102 may refer to a computing device that may be configured to store one or more opcodes, an associated unique opcode characterization value and the set of operations associated with each of the one or more opcodes. In an embodiment, the database server 102 may include a special purpose operating system specifically configured to perform one or more database operations on the one or more opcodes, the associated unique opcode characterization value and the set of operations associated with each of the one or more opcodes. Examples of database operations may include, but are not limited to, Select, Insert, Update, and Delete. In an embodiment, the database server 102 may be further configured to one or more opcodes. In an embodiment, the database server 102 may include hardware and/or software that may be configured to perform one or more predetermined operations. In an embodiment, the database server 102 may be realized through various technologies such as, but not limited to, Microsoft® SQL Server, Oracle®, IBM DB2®, Microsoft Access®, PostgreSQL®, MySQL® and SQLite®, and the like.

In an embodiment, the database server 102 may be configured to store one or more opcodes associated with the plurality of printed characters of a language and a font type. Further, the database server 102 may be configured to store a unique opcode characterization value, and a set of operations associated with the unique opcode characterization value. The database server 102 may be configured to transmit the set of operations associated with the unique opcode characterization value to the application server 104 based on a received request.

A person with ordinary skills in the art will understand that the scope of the disclosure is not limited to the database server 102 as a separate entity. In an embodiment, the functionalities of the database server 102 can be integrated into the application server 104, and vice versa.

In an embodiment, the application server 104 may refer to a computing device or a software framework hosting an application or a software service. In an embodiment, the application server 104 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 104 may be realized through various types of application servers such as, but are not limited to, a Java application server, a .NET framework application server, a Base4 application server, a PHP framework application server, or any other application server framework.

In an embodiment, the application server 104 may be configured to perform optical character recognition on an image including a plurality of printed characters. The application server 104 may be configured to receive, from the user-computing device 106, a request for performing optical character recognition on an image including the plurality of printed characters. The application server 104 may be configured to perform one or more pre-processing operations on the image including the plurality of printed characters. The application server 104 may be configured to define the one or more opcodes and direction pointers associated with the plurality of printed characters of a language and a font type. The application server 104 may be configured to group the plurality of printed characters into a plurality of buckets based on one or more common pre-defined features associated with each of the plurality of printed characters. In an embodiment, the each of the plurality of buckets may be associated with each of the plurality of nodes. The application server 104 may be configured to create a binary tree comprising a plurality of nodes. In an embodiment, each node of the plurality of nodes may be assigned the unique opcode characterization value, associated with each of the one or more opcodes, and the direction pointers comprising a first pointer value and a second pointer value. The application server 104 may be configured to retrieve from the database server 102 the set of operations associated with the unique opcode characterization value assigned to each of the plurality of nodes. The application server 104 may be configured to navigate the binary tree from a root node to a leaf node based on the set of operations, the first pointer value, and the second pointer value until the leaf node from the plurality of nodes may be reached. The application server 104 may be configured to display each of the recognized unique printed character from the plurality of printed characters. The application server 104 may be configured to transmit the recognized unique printed character from the plurality of printed characters to the user-computing device 106. The operation of the application server 104 has been discussed later in conjunction with FIG. 2.

In an embodiment, the user-computing device 106 may refer to a computing device used by a user. The user-computing device 106 may comprise of one or more processors and one or more memories. The one or more memories may include computer readable code that may be executable by the one or more processors to perform predetermined operations. In an embodiment, the user-computing device 108 may present the user-interface to the user to provide a user input that comprises the language and the font type associated with the plurality of printed characters. Further, the user-computing device 108 may be configured to receive information pertaining to the recognized unique printed character from the plurality of printed characters. Further, the user-computing device 108 may be configured to display the recognized unique printed character from the plurality of printed characters based on the received information. Examples of the user-computing device 108 may include, but are not limited to, a personal computer, a laptop, a personal digital assistant (PDA), a mobile device, a tablet, or any other computing device.

A person having ordinary skill in the art will appreciate that the scope of the disclosure is not limited to realizing the application server 104 and the user-computing device 106 as separate entities. In an embodiment, the application server 104 may be realized as an application program installed on and/or running on the user-computing device 106 without departing from the scope of the disclosure.

In an embodiment, the communication network 108 may correspond to a communication medium through which the database server 102, the application server 104, and the user-computing device 106 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 108 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
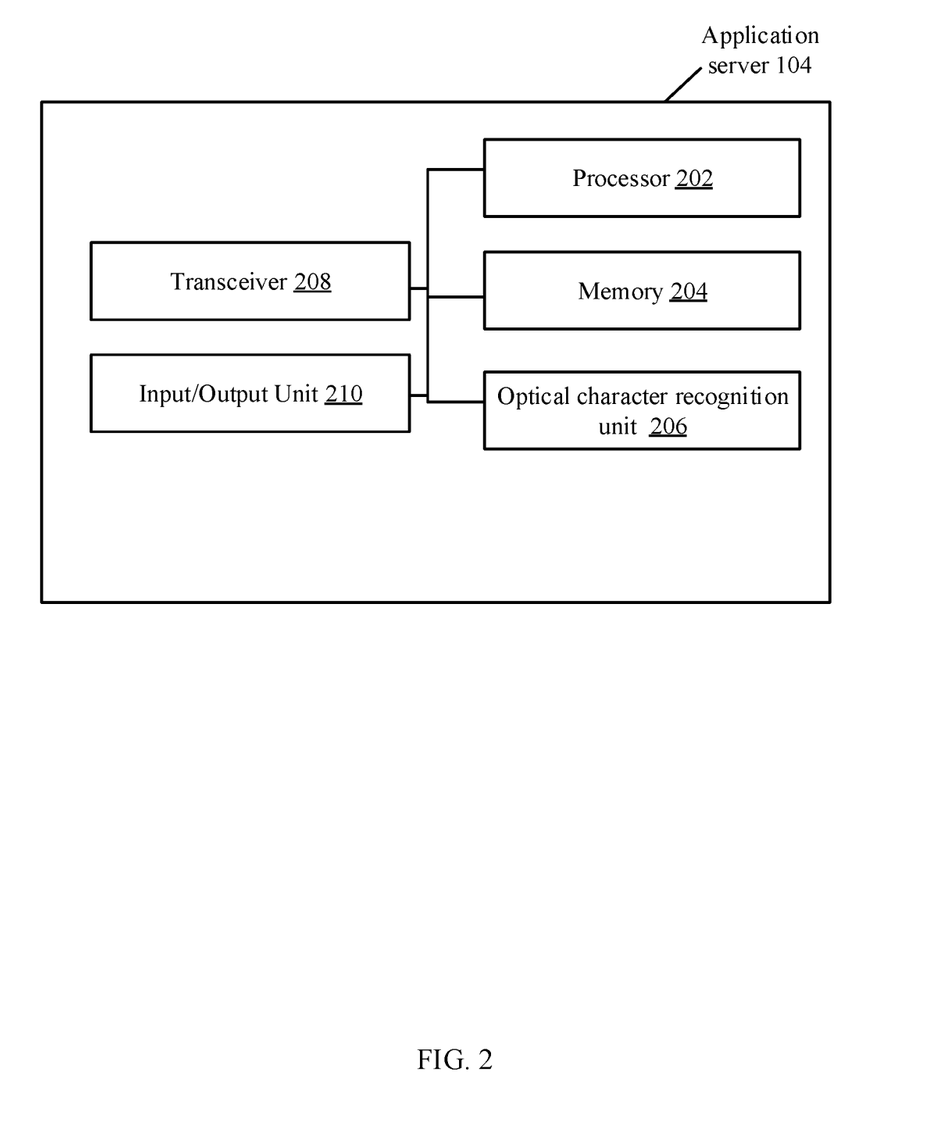
FIG. 2 is a block diagram that illustrates an application server configured to perform optical character recognition on an image including a plurality of printed characters, in accordance with some embodiments of the present disclosure.

FIG. 2 is a block diagram that illustrates an application server 104 configured to perform optical character recognition on an image including a plurality of printed characters, in accordance with some embodiments of the present disclosure. The application server 104 further comprises a processor 202, a memory 204, an optical character recognition unit 206, a transceiver 208, and an input/output unit 210. The processor 202 may be communicatively coupled to the memory 204, the optical character recognition unit 206, the transceiver 208, and the input/output unit 210.

The processor 202 comprises suitable logic, circuitry, interfaces, and/or code that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which may be executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The optical character recognition unit 206 comprises suitable logic, circuitry, interfaces, and/or code that may be configured to define one or more opcodes and direction pointers associated with the plurality of printed characters of a language and a font type. The optical character recognition unit 206 may be configured to create a binary tree comprising a plurality of nodes. In an embodiment, the each node of the plurality of nodes may be assigned the unique opcode characterization value, associated with each of the one or more opcodes, and the direction pointers comprising a first pointer value and a second pointer value. The optical character recognition unit 206 may be configured to navigate the binary tree from a root node to a leaf node based on the set of operations, the first pointer value, and the second pointer value until the leaf node from the plurality of nodes may be reached.

The transceiver 208 comprises of suitable logic, circuitry, interfaces, and/or code that may be configured to retrieve a set of operations associated with the unique opcode characterization value assigned to each of the plurality of nodes from the database server 102, via the communication network 108. The transceiver may be further configured to transmit information pertaining to the recognized unique printed character from the plurality of printed characters. The transceiver 208 may implement one or more known technologies to support wired or wireless communication with the communication network. In an embodiment, the transceiver 208 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)

The Input/Output (I/O) unit 210 comprises suitable logic, circuitry, interfaces, and/or code that may be configured to receive an input or transmit an output. The input/output unit 210 comprises of various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker.

In operation, the user-computing device 106 may be configured to capture an image of a document including a plurality of printed characters that need to be recognized. In an embodiment, the user-computing device 106 may be configured to provide user input that comprises the language and the font type associated with the plurality of printed characters. In an embodiment, the user-computing device 108 may present a user-interface to the user to provide a user input that comprises the language and the font type associated with the plurality of printed characters.

After providing the user input, the user-computing device 106 may be configured to transmit a request along with the image of the document and the user input to the application server 104 for recognizing the plurality of printed characters. In an embodiment, the plurality of printed characters may be referred to as characters that may be obtained on a document as a result of printing process implemented by a printer device. In an embodiment, printed characters may not include handwritten characters. In an embodiment, the printed characters comprise the alphabets associated with a particular language and a particular font type. In an embodiment, the printed characters may also comprise special characters. Examples of the printed characters for the English language and font type Times new roman may comprise the 26 alphabets of the English language.

In an embodiment, the transceiver 208 may be configured to receive the request along with the image of the document and the user input. In response to the received request, the optical character recognition unit 206 may be configured to perform one or more pre-processing operations on the image including the plurality of printed characters. In an embodiment, the one or more pre-processing operations comprise at least one of a skew correction, a line segmentation, a word segmentation, or a character segmentation.

In an embodiment, after performing the one or more pre-processing operations, the optical character recognition unit 206 may be configured to define one or more opcodes and direction pointers associated with the plurality of printed characters of the language and the font type. In an embodiment, each of the one or more opcodes has an associated unique opcode characterization value. In an embodiment, the one or more opcodes may be generated based on one or more pre-defined features associated with each of the plurality of printed characters. In an embodiment, one or more pre-defined features may refer to one or more characteristics associated with the plurality of printed characters. In an embodiment, the one or more pre-defined features associated with each of the plurality of printed characters may be based on one or more geometric features comprising slope, curvature, vertical/horizontal line, a square, or a circle. In an embodiment, the one or more pre-defined features may comprise a vertical line on left side of printed character i.e. slope is infinity, non-vertical line on left side printed character, vertical line on right side of printed character, horizontal lines on characters, top horizontal line slope is zero, horizontal line at center, right vertical line, left slope decrease, and left slope increase.

In an embodiment, the one or more pre-defined features may comprise one or more common pre-defined features and one or more unique pre-defined features. In an embodiment, one or more printed characters may have more than one pre-defined features that may be common. Such features are referred to as one or more common pre-defined features. In an embodiment, for the printed characters B, D, E, F, H, I, K, L, M, N, P, R, U the one or more common features may comprise a vertical line on left side of printed character i.e. slope is infinity, a horizontal line on characters. In an embodiment, for the printed characters A, C, G, J, O, Q, S, T, V, W, X, Y, Z the one or more common features may comprise non-vertical line on left side printed character, top horizontal line slope is zero.

A person having ordinary skill in the art will appreciate that the scope of the disclosure is not limited to the one or more common features that have been described herein. In an embodiment, one or more unique features apart from the features mentioned herein may be utilized while creation and navigation of the binary tree without departing from the scope of the disclosure.

In an embodiment, one or more printed characters may have more than one pre-defined features that may be unique. In an embodiment, the one or more unique features for printed character H may comprise a vertical line on left side of printed character i.e. slope is infinity, a vertical line on right side of printed character i.e. slope is infinity, and a horizontal line at center. Thus, based on the one or more unique features the printed character H may be recognized by navigating the binary tree. Similarly, the one or more unique features for printed character J may comprise a non-vertical line on left side printed character, and a right vertical line. Thus, based on the one or more unique features the printed character J may be recognized by navigating the binary tree. Similarly, the one or more unique features for printed character A may comprise a non-vertical line on left side printed character, and a left slope decrease. Thus, based on the one or more unique features the printed character A may be recognized by navigating the binary tree.

For example, the one or more common features for the printed characters B, D, E, F, H, I, K, L, M, N, P, R, U may include a vertical line on left side of printed character. Similarly, the one or more common features for the printed characters A, C, G, J, O, Q, S, T, V, W, X, Y, Z may include a non-vertical line on left side printed character. Similarly, the one or more common features for the printed characters H, M, N may include a vertical line on right side of printed character i.e. slope is infinity. Similarly, the one or more common features for the printed characters L, F, E may include a horizontal line on characters. Similarly, the one or more common features for the printed characters T, Z may include a top horizontal line slope is zero. For example, the one or more unique features for the printed character H may include a horizontal line at center. Similarly, the one or more unique features for the printed character J may include a right vertical line. Similarly, the one or more unique features for the printed character A may include a left slope decrease.

A person having ordinary skill in the art will appreciate that the scope of the disclosure is not limited to the one or more unique features that have been described herein. In an embodiment, one or more unique features apart from the features mentioned herein may be utilized while creation and navigation of the binary tree without departing from the scope of the disclosure.

In an embodiment, a plurality of opcodes may be pre-stored in the database server 102 in the form of a table. In an embodiment, the table may be referred to as master feature memory bank. The plurality of opcodes may be implemented for a plurality of languages and plurality of fonts. In an embodiment, the plurality of opcodes may be referred to as numbers that start from "0" onwards and maximum of "255", in an embodiment. In an embodiment, the numbers encompassed by the one or more opcodes may be expanded based on the number of printed characters available in each language. In an embodiment, the opcode associated with 0 is a reserved opcode. In an embodiment, the one or more opcodes may be utilized to identify one or more common features or one or more unique features that the printed character satisfies. For example, the opcode 1 may be utilized to detect if the printed character has a left vertical line. Similarly, opcode 2 may be utilized to detect if the printed character has a top horizontal line.

In an embodiment, the one or more opcodes may be selected from the plurality of opcodes based on the user input comprising the language and the font type associated with the plurality of characters. In an embodiment, the master feature memory bank may store a relationship map between the user input data, a plurality of buckets based on one or more common pre-defined features associated with each of the plurality of printed characters and the plurality of opcodes. In an embodiment, the plurality of characters in a bucket from the plurality of buckets may have one or more common pre-defined features. Table 1 is a sample illustration of the master feature memory bank.

TABLE 1

| User Input | Bucket | Opcodes | Opcode characterization value |
|---|---|---|---|
| Language type 1 (English) | Bucket 1 (B, D, F, E, H, I, K, L, M, N, P, R, U) | Opcode 1 (left vertical) | 0 |
| | | (left vertical) | 1 |
| | | Opcode 2 (right vertical) | 2 |
| | | | 3 |
| | | | 4 |
| | Bucket 2 (A, C, G, J, O, Q, S, T, V, W, X, Y, Z) | Opcode 3 (slope decrease) | 5 |
| | | . | . |
| | | Opcode 4(top horizontal) | . |
| | | | 255 |
| | | . | |
| | | . | |
| | | Opcode N | |
| Font type (Times new roman) | Bucket 1 | Opcode1 | 0 |
| | Bucket 2 | Opcode 2 | 1 |
| | . | . | 2 |
| | . | . | 3 |

TABLE 1-continued

| User Input | Bucket | Opcodes | Opcode characterization value |
|---|---|---|---|
| . | . | . | 4 |
| | Bucket N | Opcode N | 5 |
| | | | . |
| | | | . |
| | | | 255 |
| Character features: | Bucket 1 | Opcode1 | 0 |
| vertical line on left side of printed character i.e. slope is infinity | Bucket 2 | Opcode 2 | 1 |
| | . | . | 2 |
| non-vertical line on left side printed character | . | . | 3 |
| | . | . | 4 |
| vertical line on right side of printed character | Bucket N | Opcode N | 5 |
| horizontal lines on characters | | | . |
| top horizontal line slope is zero | | | . |
| horizontal line at center | | | 255 |
| right vertical line | | | |
| left slope decrease | | | |
| left slope increase | | | |

As shown in the table 1 above, if the language input is English then there are two buckets formed based on the one or more common features associated with each of the plurality of printed characters. In an embodiment, all the printed characters on bucket 1 (i.e. B,D,F,E,H,I,K,L,M,N,P,R,U) have one or more common features. Similarly, all the printed characters on bucket 2 (A,C,G,J,O,Q,S,T,V,W,X,Y,Z) have one or more common features. For example, for the printed characters B, D, E, F, H, I, K, L, M, N, P, R, U the one or more common features may comprise a vertical line on left side of printed character i.e. slope is infinity, a horizontal line on characters.

Further, as shown in the table 1 above, the last column includes one or more opcodes that may be utilized for navigation of the binary tree. In an embodiment, the one or more opcodes may be utilized to identify one or more common features or one or more unique features that the printed character satisfies. For example, the opcode 1 may be utilized to detect if the printed character has a left vertical line. Similarly, opcode 2 may be utilized to detect if the printed character has a right horizontal line. In an embodiment, the opcodes may be retrieved for navigation based on the unique opcode characterization value associated with each of the one or more opcodes.

After defining the one or more opcodes and the direction pointers associated with the plurality of printed characters of the language and the font type, the optical character recognition unit 206 may be configured to create a binary tree comprising a plurality of nodes. In an embodiment, the each node of the plurality of nodes may be assigned a unique opcode characterization value associated with each of the one or more opcodes, and the direction pointers comprising a first pointer value and a second pointer value. In an embodiment, the one or more opcodes may be assigned to each of the plurality of nodes based on the one or more common features or the one or more unique features associated with each of the plurality of printed characters in each bucket.

For example, for the printed characters B, D, E, F, H, I, K, L, M, N, P, R, U the one or more common features may comprise a vertical line on left side of printed character i.e. slope is infinity, a horizontal line on characters. In an embodiment, one or more printed characters may have more than one pre-defined features that may be unique. For example, the one or more unique features for printed character H may comprise a vertical line on left side of printed character i.e. slope is infinity, a vertical line on right side of printed character i.e. slope is infinity, and a horizontal line at center. Thus, each node from the plurality of nodes of the binary tree have a unique opcode characterization value associated with it. Based on the unique opcode characterization value, the associated opcode from the defined one or more opcodes may be retrieved and the direction pointers in the associated opcode may be utilized to identify whether to proceed to a left node or a right node in the next level of the binary tree.

After creation of the binary tree, the optical character recognition unit 206 may be configured to group the plurality of printed characters into a plurality of buckets based on one or more common pre-defined features associated with each of the plurality of printed characters. In an embodiment, each of the plurality of buckets may be associated with each of the plurality of nodes. In an embodiment, one or more common pre-defined features may be derived from mathematical functions such as, slope values (slope=0/+/−/∞). In an embodiment, each pre-defined feature may be categorized based on the type of the slope (closer to 0, closer to infinity, increasing, decreasing, curvature and the like.) and mapped to the plurality of nodes in the binary tree. In an embodiment, as shown in table 1, one or more common pre-defined features may be mapped with one or more opcodes. For example, the printed characters B, D, E, F, H, I, K, L, M, N, P, R, U may be grouped together in one bucket as the printed characters have one or more common features that may comprise a vertical line on left side of printed character i.e. slope is infinity. Similarly, the printed characters A, C, G, J, O, Q, S, T, V, W, X, Y, Z may be grouped together in another bucket as the one or more common features of the printed characters may comprise non-vertical line on left side printed character, and top horizontal line slope is zero.

After grouping the plurality of printed characters into the plurality of buckets, the transceiver 208 may be configured to retrieve a set of operations associated with the unique opcode characterization value assigned to each of the plurality of nodes. The optical character recognition unit 206 may be configured to navigate the binary tree from a root node to a leaf node based on the set of operations, the first pointer value, and the second pointer value until the leaf node from the plurality of nodes may be reached. In an embodiment, each of the leaf nodes represent one or more unique pre-defined features associated with a unique printed character from the plurality of printed characters. While navigating the binary tree, each of the plurality of printed characters may be provided as input to the root node of the binary tree one at a time. At each node in the binary tree, the first pointer value and the second pointer value indicate which node in the next level should be navigated to. In an embodiment, the first pointer value and the second pointer value of each of the leaf nodes may be NULL and the one or more opcodes associated with each of the leaf nodes may be invalid. In order to recognize each of the plurality of printed characters, the navigation may be performed for each of the plurality of printed characters until the leaf node may be reached. In an embodiment, the set of operations and the one or more opcodes act on the each printed character till the leaf node may be obtained and an invalid Opcode with direction pointers i.e. first pointer value and second pointer value may be equal to NULL. Thus, the set of operations, the one or more opcodes and the direction pointers may be utilized to navigate through the nodes of the binary tree to arrive at a leaf node accurately and the leaf node represents characteristics of a unique printed character. In an embodiment, the binary tree may provide a time efficient navigation to the leaf node.

In an embodiment, the Input/Output (I/O) unit 210 may be configured to display each of the recognized unique printed character from the plurality of printed characters on a display screen of the application server 104. After determining each of the printed characters from the plurality of the printed characters, the transceiver 208 may be configured to transmit information pertaining to the recognized plurality of the printed characters to the user-computing device 106. Further, the user-computing device 108 may be configured to receive information pertaining to the recognized unique printed character from the plurality of printed characters. Further, the user-computing device 108 may be configured to display the recognized unique printed character from the plurality of printed characters, on a display screen of the user-computing device 106, based on the received information.

In an embodiment, there may be no need of analyzing boundary slopes at every boundary stops or inflection points on each printed character. The one or more pre-defined features at each node in the binary tree result in lesser number of nodes or lesser binary tree depth and hence faster processing time. In an embodiment, the method disclosed herein may be adaptable and customized based on the user input such as multiple languages, and font types. In an embodiment, different one or more pre-defined Opcodes may be assigned, adapted or combined suitably for multiple language and font types.

Figure 3:
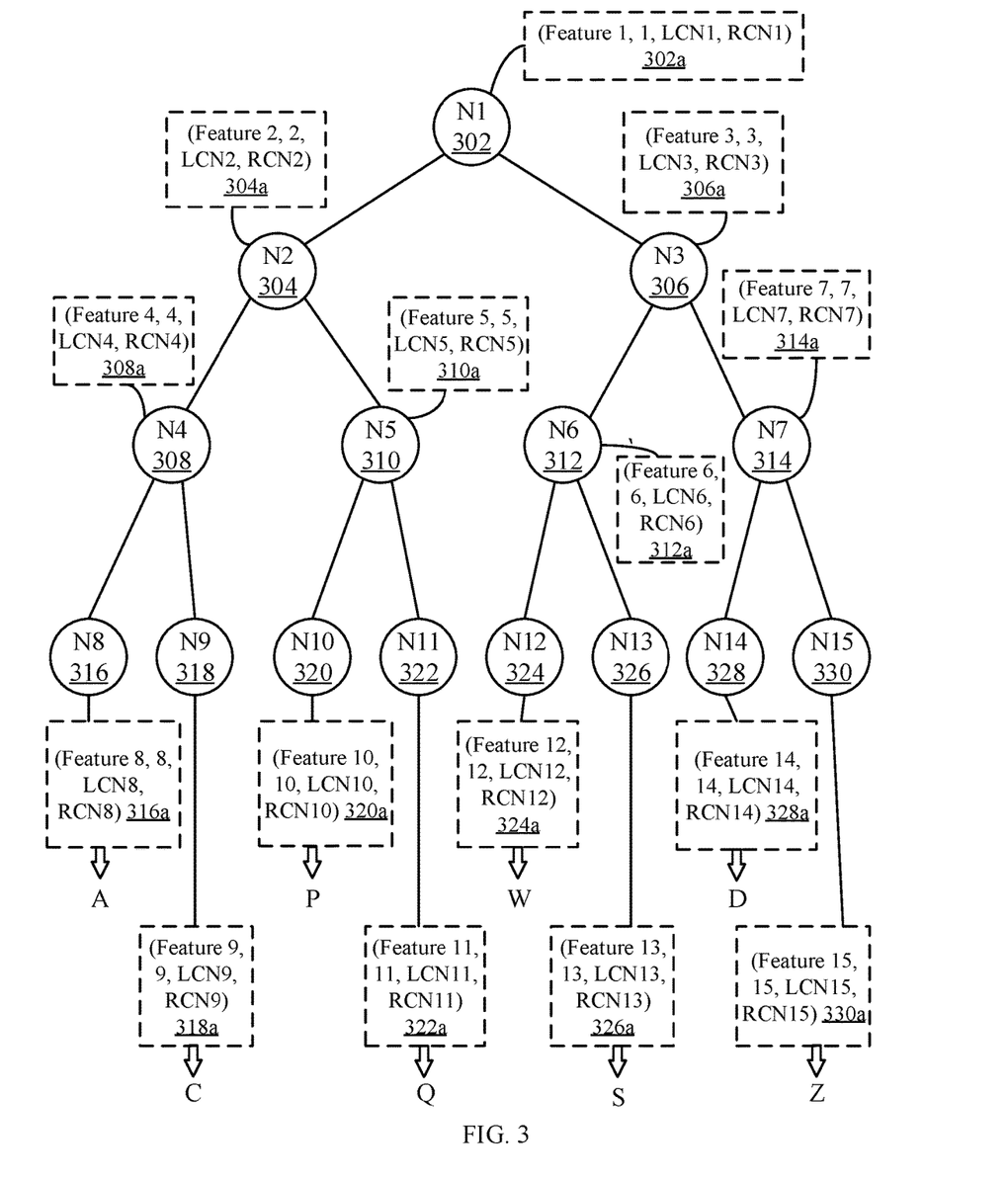
FIG. 3 is a block diagram that illustrates traversal of binary tree till a second level, in accordance with some embodiments of the present disclosure.

FIG. 3 is a block diagram that illustrates traversal of binary tree 300 till a second level, in accordance with some embodiments of the present disclosure. FIG. 3 shows a plurality of nodes N1, N2, N3, N4, N5, N6, N7, N8, N9, N10, N11, N12, N13, N14, and N15 denoted by 302, 304, 306, 308, 310, 312, 314, 316, 318, 320, 322, 324, 326, 328, and 330, respectively. The root node may correspond to N1 denoted by 302. Node N2 and Node N3 are in the first level of the binary tree 300. Further, node N4, node N5, node N6 and Node N7 are in the second level of the binary tree 300 and node N8, node N9, node N10, node N11, node N12, node N13, node N14, and Node N15 are the leaf nodes of the binary tree 300.

In an embodiment, for the purpose of explanation, using an optical scanner an image of a PAN card (document) containing a plurality of printed characters is considered. After scanning the document i.e. PAN card, the image may be preprocessed to take care of skew, intensity variation and character extraction. In an embodiment, the plurality of printed characters may be input into the root node N1 302 of the binary tree one at a time. In an embodiment, the user may provide input that comprises the language type i.e. English and font type i.e. Times New Roman.

In an embodiment, one or more opcodes and direction pointers associated with the plurality of printed characters may be defined. Further, the binary tree 300 may be created and each node of the plurality of nodes may be assigned the unique opcode characterization value, direction pointers comprising a first pointer value and a second pointer value. In an embodiment, the unique opcode characterization value may be represented by 1, 2, 3, 4, 5, 6, 7, 8, 9, 10, 11, 12, 13, 14, and 15. In an embodiment, each node may be associated with one or more pre-defined features associated with each of the plurality of printed characters. In an embodiment, the one or more pre-defined features may be represented as F1, F2, F3, F4, F5, F6, F7, F8, F9, F10, F11, F12, F13, F14, and F15. In an embodiment, the first pointer value may correspond to Left Child Node (LCN) and the second pointer value may correspond to Right Child Node (RCN). Table 2 as shown below illustrates the mapping between the one or more pre-defined features, the unique opcode characterization value, and the one or more opcodes. In an embodiment, the master feature memory bank may include the mapping between the one or more pre-defined features, the unique opcode characterization value, and the one or more opcodes.

TABLE 2

| One or more pre-defined features | One or more opcodes | Unique opcode characterization value |
| --- | --- | --- |
| F1 | OC1 | 1 |
| F2 | OC2 | 2 |
| F3 | OC3 | 3 |
| F4 | OC4 | 4 |
| F5 | OC5 | 5 |
| F6 | OC6 | 6 |
| F7 | OC7 | 7 |
| F8 | OC8 | 8 |
| F9 | OC9 | 9 |
| F10 | OC10 | 10 |
| F11 | OC11 | 11 |
| F12 | OC12 | 12 |
| F13 | OC13 | 13 |
| F14 | OC14 | 14 |
| F15 | OC15 | 15 |

In an embodiment, each node of the plurality of nodes may be assigned the unique opcode characterization value, associated with each of the one or more opcodes, and the direction pointers comprising a first pointer value and a second pointer value. For example, one or more features comprising F1, F2, F3, F4, F5, F6, F7, F8, F9, F10, F11, F12, F13, F14, and F15 may be associated with the plurality of nodes comprising N1, N2, N3, N4, N5, N6, N7, N8, N9, N10, N11, N12, N13, N14, and N15 denoted by 302, 304, 306, 308, 310, 312, 314, 316, 318, 320, 322, 324, 326, 328, and 330, respectively. In an embodiment, the feature 1 denoted by F1, the characterization value that corresponds to 1 and direction pointers LCN1 and RCN1 may be associated with node N1 denoted by 302. In an embodiment, the feature 1 denoted by F1, the characterization value that corresponds to 1 and direction pointers LCN1 and RCN1 may be collectively denoted as 302a. In an embodiment, if the feature F1 is present in the printed character that is fed to the root node N1 302, then the next node must be node N3 denoted by 306 and if the feature is absent in the printed character that is fed to the root node N1 302, then the next node must be node N2 denoted by 304. In order to determine whether the feature is present or absent, based on the unique characterization value at the root node i.e. 1 may be utilized to retrieve the set of operations that the associated one or more opcodes may perform. For example, at the root node N1 denoted by 302, the opcode OC1 associated with the unique characterization value at the root node i.e. 1 may be executed to arrive a decision on which next node on the next level should be navigated to.

Similarly, at node N2 denoted by 304 it may be determined if feature F2 is present in the character that is fed to the node N2 based on the opcode OC2 associated with the unique characterization value i.e. 2, and the direction pointers LCN2, and RCN2, that are collectively referred to as 304a. Similarly, at node N3 denoted by 306 it may be determined if feature F3 is present in the character that is fed to the node N3 based on the opcode OC3 associated with the unique characterization value i.e. 3, and the direction pointers LCN3, and RCN3, that are collectively referred to as 306a. Similarly, at node N4 denoted by 308 it may be determined if feature F4 is present in the character that is fed to the node N4 based on the opcode OC4 associated with the unique characterization value i.e. 4, and the direction pointers LCN4, and RCN4, that are collectively referred to as 308a. Similarly, at node N5 denoted by 310 it may be determined if feature F5 is present in the character that is fed to the node N5 based on the opcode OC5 associated with the unique characterization value i.e. 5, and the direction pointers LCN5, and RCN5, that are collectively referred to as 310a. Similarly, at node N6 denoted by 312 it may be determined if feature F6 is present in the character that is fed to the node N6 based on the opcode OC6 associated with the unique characterization value i.e. 6, and the direction pointers LCN6, and RCN6, that are collectively referred to as 312a. Similarly, at node N7 denoted by 314 it may be determined if feature F7 is present in the character that is fed to the node N7 based on the opcode OC7 associated with the unique characterization value i.e. 7, and the direction pointers LCN7, and RCN7, that are collectively referred to as 314a.

After navigating to either of the nodes in the second level, the binary tree 300 may be navigated to either of the leaf nodes. Thus, at node N8 denoted by 316 it may be determined if feature F8 is present in the character that is fed to the node N8 based on the opcode OC8 associated with the unique characterization value i.e. 8, and the direction pointers LCN8, and RCN8, that are collectively referred to as 316a. At node N9 denoted by 318 it may be determined if feature F9 is present in the character that is fed to the node N9 based on the opcode OC9 associated with the unique characterization value i.e. 9, and the direction pointers LCN9, and RCN9, that are collectively referred to as 318a. At node N10 denoted by 320 it may be determined if feature F10 is present in the character that is fed to the node N10 based on the opcode OC10 associated with the unique characterization value i.e. 10, and the direction pointers LCN10, and RCN10, that are collectively referred to as 320a.

At node N11 denoted by 322 it may be determined if feature F11 is present in the character that is fed to the node N11 based on the opcode OC11 associated with the unique characterization value i.e. 11, and the direction pointers LCN11, and RCN11, that are collectively referred to as 322a. At node N12 denoted by 324 it may be determined if feature F12 is present in the character that is fed to the node N12 based on the opcode OC12 associated with the unique characterization value i.e. 12, and the direction pointers LCN12, and RCN12, that are collectively referred to as 324a. At node N13 denoted by 326 it may be determined if feature F13 is present in the character that is fed to the node N13 based on the opcode OC13 associated with the unique characterization value i.e. 13, and the direction pointers LCN13, and RCN13, that are collectively referred to as 326a.

At node N14 denoted by 328 it may be determined if feature F14 is present in the character that is fed to the node N14 based on the opcode OC14 associated with the unique characterization value i.e. 14, and the direction pointers LCN14, and RCN14, that are collectively referred to as 328a. At node N15 denoted by 330 it may be determined if feature F15 is present in the character that is fed to the node N15 based on the opcode OC15 associated with the unique characterization value i.e. 15, and the direction pointers LCN15, and RCN15, that are collectively referred to as 330a.

For each of the leaf nodes N8, N9, N10, N11, N12, N13, N14, and N15 denoted by 316, 318, 320, 322, 324, 326, 328, and 330, respectively the corresponding direction pointers LCN and RCN are equal to NULL and the opcodes associated with each of the leaf nodes are invalid. Thus, the set of operations using the one or more opcodes associated with the unique opcode characterization value may be executed until the leaf node may be reached in the binary tree 300. Further, each leaf node has one or more unique features associated with a unique printed character. For example, as shown in FIG. 3, leaf node N8 represents the printed character 'A', leaf node N9 represents the printed character 'C', leaf node N10 represents the printed character 'P', leaf node N11 represents the printed character 'Q', leaf node N12 represents the printed character 'W', leaf node N13 represents the printed character 'S', leaf node N14 represents the printed character 'D', and leaf node N15 represents the printed character 'Z'. In an embodiment, when the leaf node of the binary tree 300 may be reached, the recognized character may be displayed on a display screen of the user-computing device 106.

Figure 4:
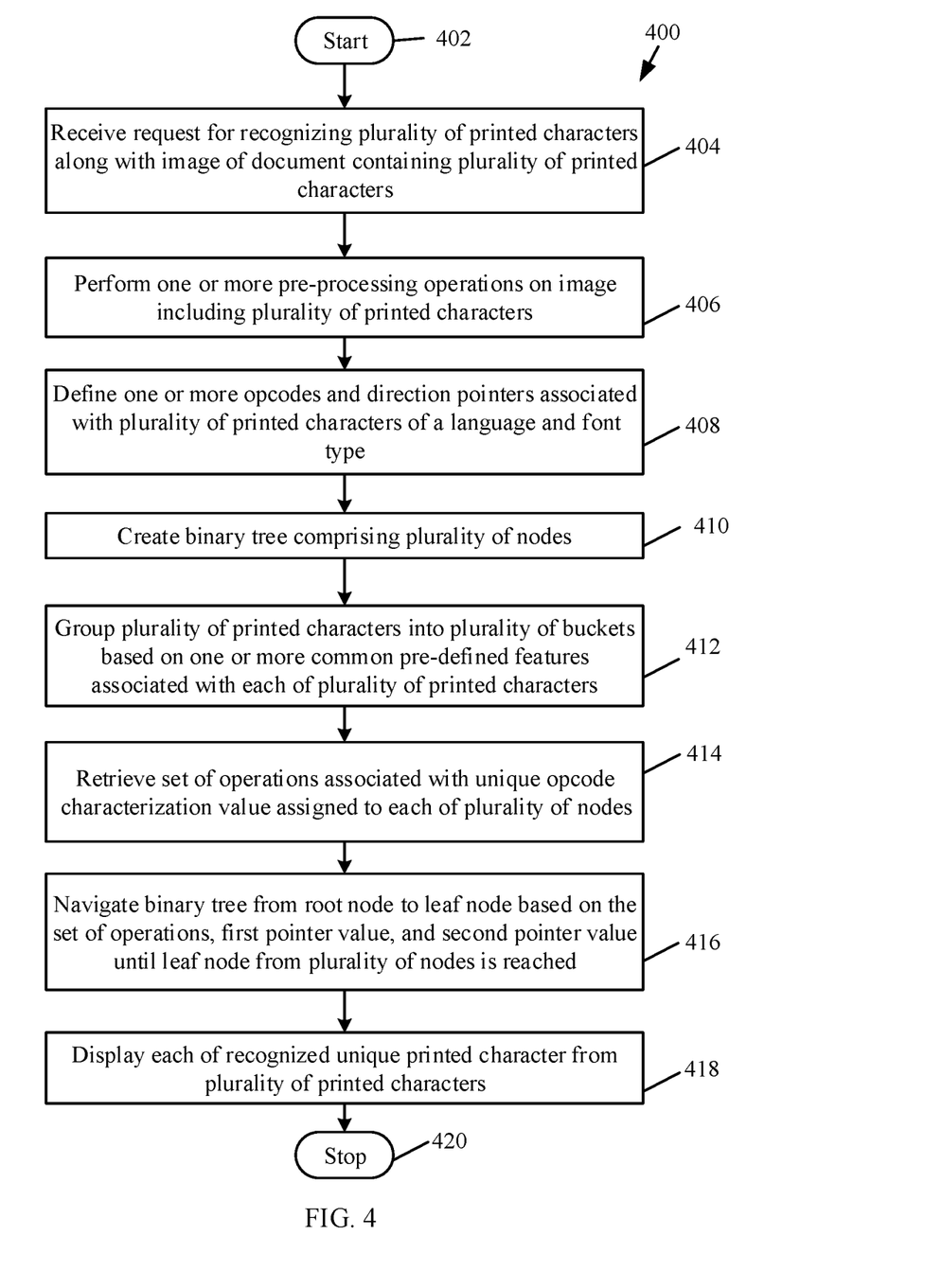
FIG. 4 is a flowchart illustrating a method for performing optical character recognition on an image including a plurality of printed characters, in accordance with some embodiments of the present disclosure.

FIG. 4 is a flowchart illustrating a method 400 for performing optical character recognition on an image including a plurality of printed characters, in accordance with some embodiments of the present disclosure. The method starts at step 402 and proceeds to step 404.

At step 404, the application server 104 may receive a request for recognizing the plurality of printed characters along with an image of a document containing the plurality of printed characters. In an embodiment, the application server 104 may also receive a user input comprising the language and the font type associated with the plurality of printed characters. At step 406, the application server 104 may perform one or more pre-processing operations on the image including the plurality of printed characters. In an embodiment, the one or more pre-processing operations may comprise at least one of a skew correction, a line segmentation, a word segmentation, or a character segmentation. At step 408, the application server 104 may define one or more opcodes and direction pointers associated with the plurality of printed characters of a language and a font type. In an embodiment, the each of the one or more opcodes may have an associated unique opcode characterization value. At step 410, the application server 104 may create a binary tree comprising a plurality of nodes. In an embodiment, the each node of the plurality of nodes may be assigned the unique opcode characterization value, associated with each of the one or more opcodes, and the direction pointers comprising a first pointer value and a second pointer value.

At step 412, the application server 104 may group the plurality of printed characters into a plurality of buckets based on one or more common pre-defined features associated with each of the plurality of printed characters. In an embodiment, the each of the plurality of buckets may be associated with each of the plurality of node. At step 414, the application server 104 may retrieve a set of operations associated with the unique opcode characterization value assigned to each of the plurality of nodes. At step 416, the application server 104 may navigate the binary tree from a root node to a leaf node based on the set of operations, the first pointer value, and the second pointer value until the leaf node from the plurality of nodes may be reached. In an embodiment, each of the leaf nodes represent one or more unique pre-defined features associated with a unique printed character from the plurality of printed characters. At step 418, the application server 104 may display each of the recognized unique printed character from the plurality of printed characters. Control passes to end step 420.

Computer System

Figure 5:
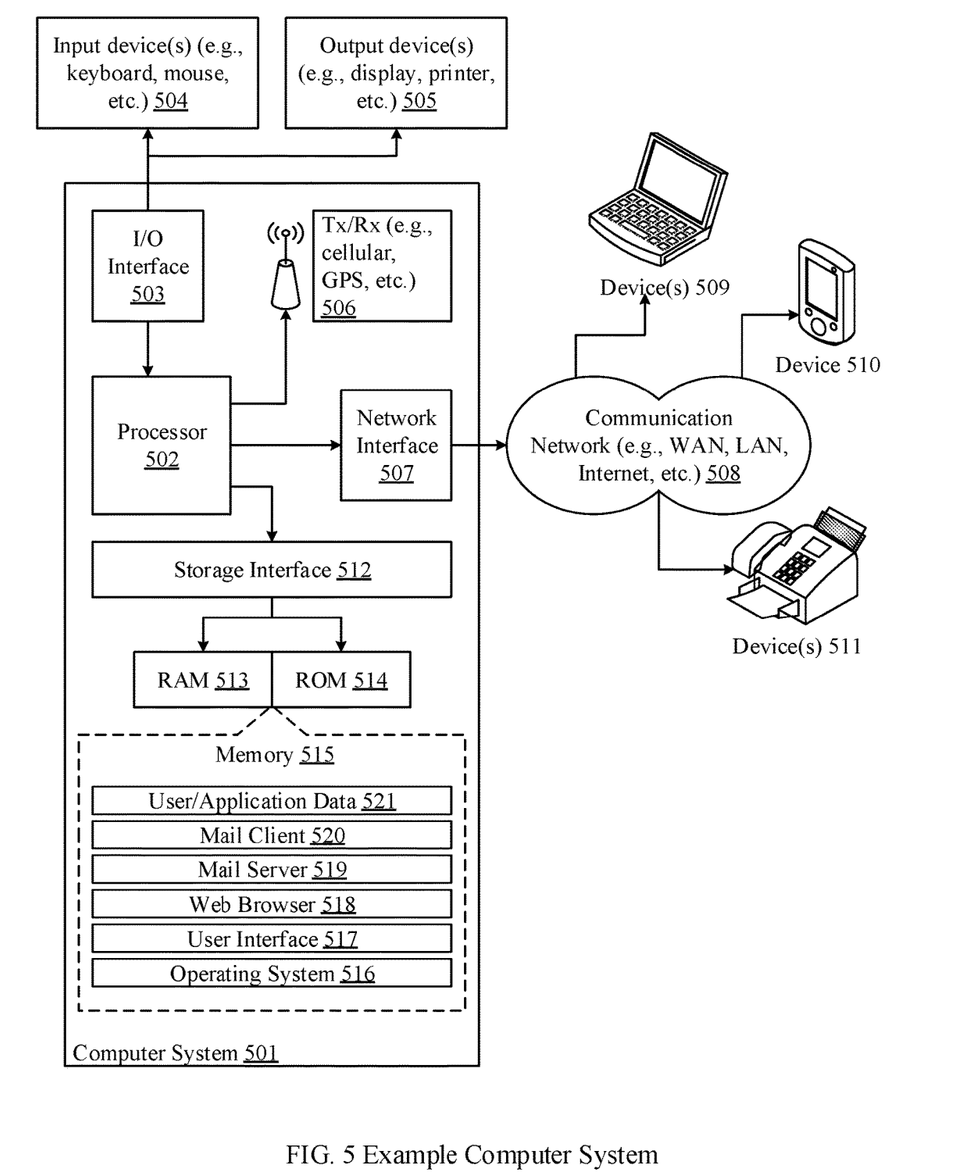
FIG. 5 illustrates a block diagram of an exemplary computer system for implementing embodiments consistent with the present disclosure.

FIG. 5 illustrates a block diagram of an exemplary computer system for implementing embodiments consistent with the present disclosure. Variations of computer system 501 may be used for performing optical character recognition on an image including a plurality of printed characters. The computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for performing optical character recognition on images that include printed characters implemented by an application server, the method comprising:
    defining opcodes and direction pointers associated with a plurality of printed characters, wherein the plurality of printed characters are included in an image and have an associated language and a font type, each of the opcodes having an associated unique opcode characterization value, wherein the opcodes are defined based on one or more pre-defined features associated with each of the plurality of printed characters, and the one or more pre-defined features associated with each of the plurality of printed characters are based on one or more geometric features comprising slope, curvature, vertical line, horizontal line, a square, or a circle;

creating a binary tree comprising a plurality of nodes, wherein each node of the plurality of nodes is assigned one of the unique opcode characterization values and at least one of the direction pointers;

retrieving a set of operations associated with one or more of the unique opcode characterization values assigned to the plurality of nodes;

navigating the binary tree from a root one of the plurality of nodes to a leaf one of the plurality of nodes based on the set of operations and the direction pointers, wherein the leaf one of the plurality of nodes represents one or more unique pre-defined features associated with a unique printed character from the plurality of printed characters; and displaying each of the unique printed characters from the plurality of printed characters based on the navigation of the binary tree.

2. The method of claim 1, further comprising receiving a user input that comprises the language and the font type associated with the plurality of printed characters.

3. The method of claim 1, further comprising performing one or more pre-processing operations on the image including the plurality of printed characters, wherein the one or more pre-processing operations comprise at least one of a skew correction, a line segmentation, a word segmentation, or a character segmentation.

4. The method of claim 1, further comprising grouping the plurality of printed characters into a plurality of buckets based on one or more common pre-defined features associated with each of the plurality of printed characters, wherein each of the plurality of buckets is associated with one or more of the plurality of nodes.

5. An application server comprising a memory comprising programmed instructions stored thereon, the memory coupled to one or more processors that are configured to be capable of executing the stored programmed instructions to:

define opcodes and direction pointers associated with a plurality of printed characters, wherein the plurality of printed characters are included in an image and have an associated language and a font type, each of the opcodes having an associated unique opcode characterization value, wherein the opcodes are defined based on one or more pre-defined features associated with each of the plurality of printed characters, and the one or more pre-defined features associated with each of the plurality of printed characters are based on one or more geometric features comprising slope, curvature, vertical line, horizontal line, a square, or a circle;

create a binary tree comprising a plurality of nodes, wherein each node of the plurality of nodes is assigned one of the unique opcode characterization values and at least one of the direction pointers;

retrieve a set of operations associated with one or more of the unique opcode characterization values assigned to the plurality of nodes;

navigate the binary tree from a root one of the plurality of nodes to a leaf one of the plurality of nodes based on the set of operations and the direction pointers, wherein the leaf one of the plurality of nodes represents one or more unique pre-defined features associated with a unique printed character from the plurality of printed characters; and display each of the unique printed characters from the plurality of printed characters based on the navigation of the binary tree.

6. The application server of claim 5, wherein the one or more processors are further configured to be capable of executing the stored programmed instructions to receive a user input that comprises the language and the font type associated with the plurality of printed characters.

7. The application server of claim 5, wherein the one or more processors are further configured to be capable of executing the stored programmed instructions to perform one or more pre-processing operations on the image including the plurality of printed characters, wherein the one or more pre-processing operations comprise at least one of a skew correction, a line segmentation, a word segmentation, or a character segmentation.

8. The application server of claim 5, wherein the one or more processors are further configured to be capable of executing the stored programmed instructions to group the plurality of printed characters into a plurality of buckets based on one or more common pre-defined features associated with each of the plurality of printed characters, wherein each of the plurality of buckets is associated with one or more of the plurality of nodes.

9. A non-transitory computer-readable medium having stored thereon instructions for performing optical character recognition on images that include printed characters that, when executed by one or more processors, cause the one or more processors to:

define opcodes and direction pointers associated with a plurality of printed characters, wherein the plurality of printed characters are included in an image and have an associated language and a font type, each of the opcodes having an associated unique opcode characterization value, wherein the opcodes are defined based on one or more pre-defined features associated with each of the plurality of printed characters, and the one or more pre-defined features associated with each of the plurality of printed characters are based on one or more geometric features comprising slope, curvature, vertical line, horizontal line, a square, or a circle;

create a binary tree comprising a plurality of nodes, wherein each node of the plurality of nodes is assigned one of the unique opcode characterization values and at least one of the direction pointers;

retrieve a set of operations associated with one or more of the unique opcode characterization values assigned to the plurality of nodes;

navigate the binary tree from a root one of the plurality of nodes to a leaf one of the plurality of nodes based on the set of operations and the direction pointers, wherein the leaf one of the plurality of nodes represents one or more unique pre-defined features associated with a unique printed character from the plurality of printed characters; and display each of the unique printed characters from the plurality of printed characters based on the navigation of the binary tree.

10. The non-transitory computer-readable medium as claimed in claim 9, wherein the programmed instructions, when executed by the one or more processors, further cause the one or more processors to receive a user input that comprises the language and the font type associated with the plurality of printed characters.

11. The non-transitory computer-readable medium as claimed in claim 9, wherein the programmed instructions, when executed by the one or more processors, further cause the one or more processors to perform one or more pre-processing operations on the image including the plurality of printed characters, wherein the one or more pre-processing operations comprise at least one of a skew correction, a line segmentation, a word segmentation, or a character segmentation.

12. The non-transitory computer-readable medium as claimed in claim 9, wherein the programmed instructions, when executed by the one or more processors, further cause the one or more processors to group the plurality of printed characters into a plurality of buckets based on one or more common pre-defined features associated with each of the plurality of printed characters, wherein each of the plurality of buckets is associated with one or more of the plurality of nodes.

* * * * *